May 5, 1931.  O. B. PARKER  1,804,364
PICKUP
Filed July 12, 1930
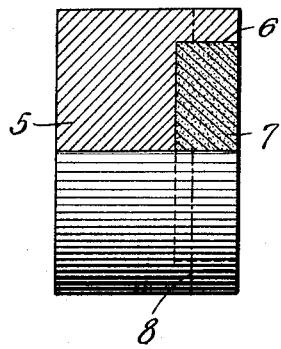
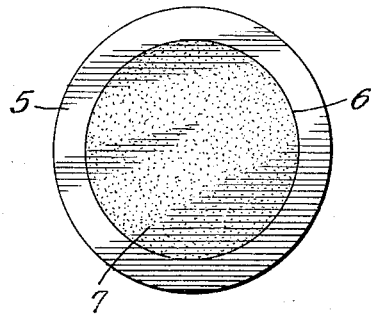
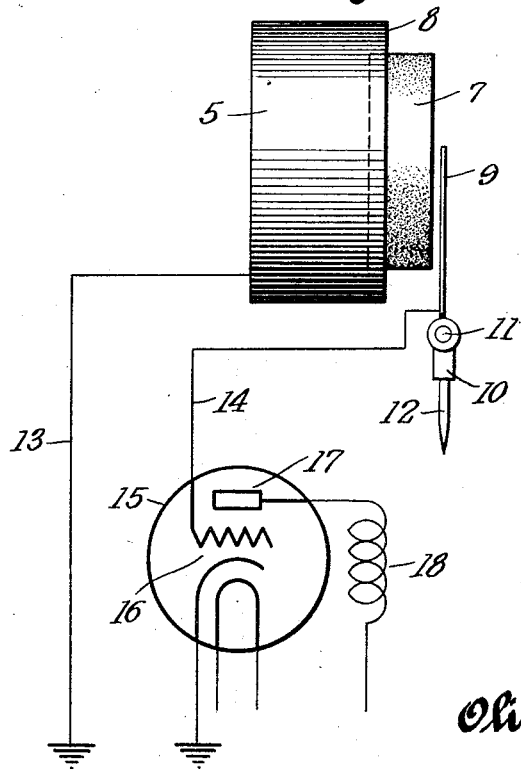
INVENTOR
Oliver B. Parker
BY
Philip S. McLean
ATTORNEY Patented May 5, 1931

1,804,364

UNITED STATES PATENT OFFICE

OLIVER B. PARKER, OF BROOKLYN, NEW YORK, ASSIGNOR TO PACENT ELECTRIC COMPANY, INC., OF NEW YORK, N. Y., A CORPORATION OF NEW YORK

PICKUP

Application filed July 12, 1930. Serial No. 467,453.

This invention relates to phonograph pickups and devices of similar nature.

The objects of the invention are to provide a device of the character mentioned of particularly simple, inexpensive and easily manufactured construction and which will be efficient and practical for the purposes desired.

A special novel feature of the invention is the utilization of the property of wax-like material to retain an electrostatic charge when the same is allowed to harden while subjected to high potential current. Other novel features of the invention relate to the manner in which this characteristic property is made available for practical purposes.

Additional features of the invention and details of construction are set forth in the following specification.

The drawing accompanying and forming part of the specification illustrates one simple commercial embodiment of the invention. It will be understood however, that this illustration is primarily for purposes of disclosure and therefore the physical structure of the device may be varied widely within the broad scope of the invention.

Figs. 1 and 2 are a part sectional side view and front view respectively of the electrostatic element in its primary form; Fig. 3 is a side view showing the mounting element turned down to expose the charged surface and having operatively related thereto the companion member of a phonograph pickup, with a simple pickup circuit diagrammatically shown.

In Figs. 1 and 2 there is shown a base member 5 of brass or similar conducting material having a cup 6 in one face of the same containing the electrostatic element, which is here a disc-like body of wax 7. The usual method of preparation is to fill the cup in the base member with melted wax, either by melting the wax in the cup member or pouring melted wax into the cup and then, as the wax hardens, to subject it to high potential direct current. A potential of 500 to 1000 volts is sufficient to permanently set the charge in the wax.

After thus forming the electrostatic element, the brass or other cup material may be cut back as along the line 8, Figs. 1 and 3 to expose this element clear of the base member.

In cooperative relation with the exposed face of the electro static element, there is provided a companion element, shown in the form of a plate or disc 9 and this latter element may be so mounted that it will be shifted in accordance with the undulations of a record groove. In the particular embodiment herein shown, the plate 9 is mounted in insulated relation on a stylus carrier 10, pivoted for oscillation on the center 11 and constructed to hold a record engaging needle 12.

The device may be utilized in various ways and for different purposes and in the present disclosure, it is shown as directly connected in a simple pickup circuit by having the two leads 13 and 14, one from the electrostatic base and the other from the movable element, connected into the input circuit of a vacuum tube 15, the latter being shown as typical, having a grid electrode 16 to which conductor 14 is connected and a plate electrode 17 connected with a suitable output circuit such as represented by the primary 18 of an output transformer.

The details of mounting and mechanically connecting the electrostatic base and the stylus holder are not shown, as these may be such as are well-known in the art.

The wax body having been charged as described, retains such charge and therefore, when the companion plate is vibrated, as from the undulations in a record groove, serves to impress correspondingly varying charges on the grid of the tube which thereupon functions for electric pickup purposes.

While the composition of the wax may vary it has been found that a wax including rosin, beeswax and carnauba wax in proportions to form a hard composition and having a low shrinkage coefficient on cooling meets the requirements of the invention. The period of charging depends upon the time required for the wax to solidify and during this period, it has been found best, for present purposes, to keep the voltage fairly uniform.

What is claimed is:

1. A pickup or the like, comprising an element having an electrostatic charge permanently incorporated therein, a companion electrostatic element insulated therefrom, said elements being relatively shiftable and electric circuit connections for said elements.

2. A device of the character disclosed, comprising an electrostatically charged body of wax-like material, a movably related plate element substantially parallel to but insulated therefrom and circuit connections for said charged wax-like body and plate.

3. In apparatus of the character disclosed, a base having a cup therein, an electrostatically charged body of wax in said cup, a movable plate electrode disposed in electrostatic relation to said charged body of wax and electric circuit connections for said charged body and electrode.

4. In apparatus of the character disclosed, a base having a cup therein, an electrostatically charged body of wax in said cup, a movable plate electrode disposed in electrostatic relation to said charged body of wax, electric circuit connections for said charged body and electrode and a stylus holder arranged to actuate said movable plate electrode.

5. In apparatus of the character disclosed, a base having a cup therein, an electrostatically charged body of wax in said cup, a movable plate electrode disposed in electrostatic relation to said charged body of wax, electric circuit connections for said charged body and electrode, a stylus holder arranged to actuate said movable plate electrode, said base being of conductive material, the plate being insulated from the stylus holder and the circuit connections being made to said base and to said insulated plate.

6. In a device of the character disclosed, a permanently charged body of wax-like material, a cooperating electrostatically related element and electric circuit connections for said permanently charged body and cooperating element.

7. An electric phonograph pickup, comprising a stylus holder, a plate electrode actuated thereby, a permanently charged electrostatic body in electrostatic relation to said plate and an electric pickup circuit connected with said plate and body.

8. An electric phonograph pickup, comprising a cup member, an electrostatically charged element in the cup of said member and having an electrostatically active surface exposed away from said cup member, a companion electrostatic element movably related to said exposed surface, a stylus member for actuating said plate element and an electric pickup circuit connected with said charged body and companion element.

9. The method of providing an active element for a phonograph pickup unit or the like, which comprises melting wax in the cup of a holder, permitting the wax to harden and subjecting the same while hardening to high potential direct current and then cutting away the cup member to further expose the charged body.

10. The method of providing an active element for a phonograph pickup or the like, which comprises melting wax in a metal holder, permitting the wax to harden, subjecting the wax while hardening to high potential direct current and thereafter utilizing the metal holder in which the hardened charged wax is seated as a circuit terminal member for the charged wax body.

11. The method of constructing a phonograph pickup unit or the like, which comprises permitting melted wax to harden, subjecting the same to high potential direct current, while hardening to set an electrostatic charge in the wax and then providing a stylus actuated electrode in electrostatic relation to said charged wax body.

12. The method of constructing an instrument of the character disclosed, which comprises electrostatically charging a wax-like body by changing the condition of said wax-like body from a fluid to a solid state, subjecting said material to an electric charging influence during the period of change from the fluid to the solid state and then disposing a cooperative electrode element in electrostatic relation to the charged solid wax-like body.

13. The herein disclosed process of preparing an electrostatic element, which comprises melting waxy material, which will harden on cooling, cooling the melted material to the hard state and subjecting said material while cooling to direct current on the order of 500 volts.

14. The method of providing an active element for an electrical instrument, which comprises melting wax in a cup-like holder, solidifying the wax by cooling, subjecting the wax while cooling to an electric current and removing the confining walls of the cup-like member to expose the activated solidified body of wax in the holder.

15. The method of forming an active element for an electrical instrument, which comprises melting a composition of rosin, beeswax and carnauba wax in proportions which will harden without undue shrinkage on cooling and subjecting said composition while cooling to an electrical charging influence.

16. In an electrical instrument, a body of hard wax having an electrostatic charge permanently incorporated therein and a conducting member movably mounted in close relation to the face of said charged hard wax body.

17. An electrical instrument, comprising a hard electrically charged wax body containing rosin, beeswax and carnauba wax, and an electrode movably supported in closely spaced relation to said charged wax body.

18. An electrical device of the general character disclosed comprising a member of a material capable of permanently retaining an electrostatic charge and having an electrostatic charge permanently incorporated therein, a companion member associated in electrically coupled relation with the first member, means for supporting said members in relatively movable relation and circuit establishing connections for said members.

In testimony whereof I affix my signature.

OLIVER B. PARKER.